UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

COMPOSITE TITANIC-OXID PIGMENT AND METHOD FOR PRODUCING THE SAME.

1,223,357.     Specification of Letters Patent.     Patented Apr. 24, 1917.

No Drawing.     Application filed August 29, 1916. Serial No. 117,398.

*To all whom it may concern:*

Be it known that I, LOUIS E. BARTON, a citizen of the United States, and a resident of Niagara Falls, in the county of Niagara and State of New York, have invented a certain new and useful Improvement in Composite Titanic-Oxid Pigments and Methods for Producing the Same, of which the following is a specification.

My present invention relates to what are now known as "composite titanic oxid pigments", being such as are generally speaking composed of particles of a sulfate, or other base, having thereto adherent and therewith coalesced minute particles of titanic oxid, and which are now producible by several different methods as witness that described and claimed in Letters Patent No. 1,155,462, granted to me October 5, 1915, or in my herewith co-pending applications for patent No. 23,520, filed April 23, 1915, No. 40,639, filed July 19, 1915, and No. 102,393, filed June 8, 1916, all of which proceed, broadly speaking, by aid of the precipitation, in a titanic solution, of various titanic compounds, in presence of, and upon, particles of a base, or what may be designated as "extender" material, insoluble, and suspended, in such solution; such particles being supplied to the solution either as, for example, in the case of a titanic sulfate solution by addition thereto of a compound capable of forming such particles by reaction with said solution, or, on the other hand, for example, by mechanically adding such particles as such to the titanic solution in the form for example of some of what is known in the trade as "extender pigments"; the precipitation of the various titanic compounds on the base particles referred to being effected by reagents, or treatments, or both, as described in said patent and applications.

The object of my present invention comprises the production of a final composite titanic oxid product, having, as I believe, greater purity, *i. e.* containing less of undesired substances and compounds than heretofore; and also the production of an intermediate, composite precipitate, product whence the first mentioned product is derivable by calcination, and the which is likewise of greater purity than analogous intermediate products of some of my said earlier methods, besides possessing other novel characteristics, qualities, and properties, superiorly fitting it for the aforesaid, and other special, uses in the arts; and the object of my invention also, and particularly, comprises the provision of methods whereby the said itnermediate and final composite precipitates and final products can be more economically, certainly, expeditiously, and generally advantageously manufactured on industrial scales than heretofore.

My present methods, resulting in my said intermediate and final products are practised as follows:

I first produce a titanic sulfate solution, in any convenient manner and from any titaniferous material; but I prefer to do this by dissolving in sulfuric acid the titanic acid product of the method described and claimed in Letters Patent No. 1,171,542, granted to Auguste J. Rossi and myself on February 15, 1916; because the titanic sulfate solution thus obtained is particularly free from impurities, and contains little, if any, free sulfuric acid, and about 11% of titanic oxid. This, or whatever other solution I employ, I dilute until it contains say about 3% of titanic oxid. I have, however, found it preferable for the preparation of certain composite titanic oxid pigments and also to expedite the subsequent operations, to use a titanic basic sulfate solution instead of the neutral solution first referred to.

I therefore, preferably, convert the latter to basic condition in any convenient manner, such, for example, as by adding, to such concentrated titanic sulfate solution, lime slaked in five parts of water. The quantity of lime thus added in any case, may be varied according to the results desired; but, I have discovered that for the purpose of subsequently precipitating basic titanic sulfate, an addition of lime chemically equivalent to 20% of the total sulfate in solution is sufficient. After the addition thereto of what may be termed lime-cream, I allow the charge to stand for, say, from about one-quarter to one-half of an hour during which I agitate it from time to time, if only for the purpose of insuring a more complete combination of the ingredients.

The resulting calcium sulfate I then filter out, and dilute the filtrate so that it shall contain, as in the previously referred to instance, about 3% of titanic oxid.

My next step is to supply to the solutions described, and in any convenient manner, the therein suspended or suspendable particles of sulfate, or other, base, or therein insoluble, matter with which the nascent titanic precipitate is to contact, adhere and coalesce in the solution as hereinafter described.

This I accomplish variously according to circumstances or requirements. For example, as shown in my said Letters Patent 1,155,462, by adding to the solution a compound, such, for example, as calcium chlorid, capable of forming by reaction with said solution an insoluble sulfate; or, otherwise, adding to the solution a base which by reaction with the sulfate therein in solution, produces a precipitate of sulfate particles such base being, in that instance, for example, an alkali earth base such as calcium hydrate, barium hydrate, barium sulfid, or any compound which ultimately acts chemically like such last mentioned bases under the conditions specified; or otherwise again, by adding, as such, to the said solution, any of the so called "extender pigments" often used in compounding paints and which are insoluble in the solution, such being, for example, silica, barytes, gypsum, china clay, or asbestine, etc.

If the referred to insoluble particles of base, or extender, material are to be supplied to the solution by their formation through chemical reactions therein, I add to the solution the lime, baryta, or whatever selected as the precipitant in the form of a solution obtained by preliminarily dissolving such precipitant in water, or bringing it into the consistency of a thin cream or slurry, according to its relative solubility. The proportions of the precipitant thus added will depend somewhat upon the desired composition of the final composite titanic oxid product. If the latter is to have a high titanic oxid content the precipitant should be added in quantity chemically equivalent to say 20% to 40% of the total sulfate in solution, and, in that case, may be added either before, or soon after, starting the hereinafter described electrolysis of the charge; but, if it be desired to add the precipitant in quantity equivalent to, say, as high as 40% to 80% of such total sulfate, I find it preferable to do so in several instalments during the progress of the electrolysis, since thereby presence of the free sulfuric acid (product thereof) is insured sufficiently to facilitate formation of the desired insoluble sulfates by reaction with the precipitant, and also to retain in solution iron, or other, impurities present. If, on the other hand, the base or extender material is to be mechanically added as such to the solution as in the form of an "extender pigment" above referred to, the entire amount may be supplied to the solution by a single charge and either before or immediately after beginning the electrolytic treatment it being preferable in such case to comminute the precipitant as finely as convenient.

My next step is to electrolyze the solution, or charge. To this end, I use an electrolytic cell provided with any convenient form of agitation adapted by its action to assist in keeping the particles of extender material in suspension in the solution. I prefer to accomplish the electrolysis by aid of passing an electric current through the charge directly from one to the other of a pair of therein supported, or therewith contacting, electrodes, preferably lead, the cell being without any diaphragm. While the voltage employed may be varied quite considerably, I have discovered that a current of from 5 to 10 volts and of a current density at the anode of about 30 amperes per square foot, gives satisfactory results. It will be noted that I thus utilize my discovery that in the required treatment, for my purposes, of the solutions employed a diaphragm, or a diaphragmed cell, is dispensed with.

During the aforesaid electrolysis I heat, as distinguished from boiling, my solution. Such heating, preferably up to from say 90° C. to 95° C., I effect in any convenient manner, as for example by injecting live steam. But I can obtain, in some instances, and according to conditions, passable results with temperatures a little lower than those mentioned. Higher temperatures may be used, even up to boiling, though such higher temperatures are, for reasons above referred to, and others, rarely, if ever, desirable.

The result of the electrolysis, under the conditions described, is to precipitate basic titanic sulfate in the form of very minute particles, the which, in nascent state, and with, as I believe, concurrent adsorption phenomena, contact with, adhere to, and coalesce with, the insoluble particles of base, or extender materials, suspended in the solution, thus producing a composite precipitate which I then filter out, wash with water, and dry, thereby producing my exceptionally pure, intermediate composite titanic product which is of great utility for many purposes in the arts.

This intermediate composite titanic product I thereafter, if desired, calcine, to complete dehydration, at from 700° C. to 800° C., thereby producing the final composite titanic oxid product of my present process, the which is of exceptional utility as a pigment in paint, and for other uses, it being freer from undesirable impurities than any other with which I am acquainted.

Having now described my invention, what I claim as new and desire to secure by Letters Patent is the following, viz:

1. The method of producing composite titanic oxid pigments which comprises supplying to a titanic sulfate solution particles of a therein suspendable base or extender, electrolyzing the charge and meanwhile heating it sufficiently to precipitate therein, and into contact with said particles, particles of basic titanic sulfate.

2. The method of producing composite titanic oxid pigments which comprises supplying to a titanic sulfate solution particles of a therein suspendable base or extender, electrolyzing the charge and meanwhile heating it sufficiently to precipitate therein, and into contact with said particles, particles of basic titanic sulfate, and filtering out the resulting composite precipitate and calcining it.

3. The method of producing composite titanic oxid pigments which comprises adding to a titanic solution a substance capable of therein precipitating sulfate particles by reaction with the sulfate in solution, electrolyzing the charge and meanwhile heating it sufficiently to precipitate therein, and into contact with said particles, particles of basic titanic sulfate.

4. The method of producing composite titanic oxid pigments which comprises adding to a titanic sulfate solution an extender pigment, electrolyzing the charge and meanwhile heating it sufficiently to precipitate therein, and into contact with said particles, particles of basic titanic sulfate.

5. In the production of composite titanic oxid pigments composed essentially of particles having thereto adherent and therewith coalesced particles of titanic oxid, the steps which consist in electrolyzing and heating a titanic sulfate solution containing said first mentioned particles.

6. In the production of composite titanic oxid pigments, the steps which consist in suspending in a titanic sulfate solution particles of therein insoluble matter and meanwhile electrolyzing and heating the charge.

7. In the production of composite titanic oxid pigments, the steps which consist in suspending in a titanic sulfate solution particles of therein insoluble matter and thereon precipitating particles of basic titanic sulfate.

8. As a new composition of matter, the herein described uncalcined composite precipitate, distinguished as consisting essentially of particles of matter having thereto adherent and therewith coalesced particles of basic titanic sulfate.

9. As a new composition of matter, the herein described, uncalcined composite precipitate, distinguished as consisting essentially of particles of extender material having therewith coalesced thereto adherent particles of basic titanic sulfate.

10. As a new composition of matter, the herein described calcined titanic oxid product, distinguished as consisting essentially of particles of extender material having thereto adherent, therewith coalesced, particles of titanic oxid.

LOUIS E. BARTON.

Witnesses:
 Tom C. Graham,
 George A. Ostertag.